(12) United States Patent
Boucheron et al.

(10) Patent No.: US 11,620,041 B1
(45) Date of Patent: Apr. 4, 2023

(54) REMINDER NOTIFICATIONS FOR MESSAGES

(71) Applicant: Zoom Video Communications, Inc., San Jose, CA (US)

(72) Inventors: Cécile Boucheron, Brooklyn, NY (US); Xin Huang, Fremont, CA (US); Ganna Isayeva, Odessa, FL (US); Kathy Q. Kong, Murrieta, CA (US); Sharvari Nerurkar, Redmond, WA (US); Archil Vardidze, Austin, TX (US); Yuchen Zhang, Zhejiang (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/589,786

(22) Filed: Jan. 31, 2022

(51) Int. Cl.
  *G06F 3/04847*   (2022.01)
  *H04L 65/403*    (2022.01)
  *G06F 3/0482*    (2013.01)

(52) U.S. Cl.
  CPC ........ *G06F 3/04847* (2013.01); *G06F 3/0482* (2013.01); *H04L 65/403* (2013.01)

(58) Field of Classification Search
  CPC ............. G06F 3/04847; G06F 3/04842; G06F 3/0482; H04L 65/403
  See application file for complete search history.

(56) References Cited

U.S. PATENT DOCUMENTS

| | | | |
|---|---|---|---|
| 10,725,626 B2 * | 7/2020 | Meixner | H04L 51/046 |
| 11,470,024 B2 * | 10/2022 | Lee | G08B 21/24 |
| 2007/0174404 A1 * | 7/2007 | Hui | G06Q 10/109 |
| | | | 709/207 |
| 2008/0037731 A1 * | 2/2008 | Bishop | H04M 3/5335 |
| | | | 379/88.22 |
| 2014/0032682 A1 * | 1/2014 | Prado | H04L 51/214 |
| | | | 709/213 |
| 2015/0331881 A1 * | 11/2015 | Myles | H04L 51/42 |
| | | | 707/689 |
| 2017/0330120 A1 * | 11/2017 | Zhang | G06Q 10/109 |
| 2018/0069906 A1 * | 3/2018 | Yang | H04L 51/212 |
| 2018/0130334 A1 * | 5/2018 | Choi | G08B 21/24 |
| 2019/0034059 A1 * | 1/2019 | Brummer | G06F 3/0481 |
| 2020/0111060 A1 * | 4/2020 | Yang | G06Q 10/10 |

* cited by examiner

*Primary Examiner* — Dino Kujundzic
(74) *Attorney, Agent, or Firm* — Cognition IP, P.C.; Edward Steakley; Rajesh Fotedar (57) ABSTRACT

Various embodiments of an apparatus, method(s), system(s) and computer program product(s) described herein are directed to a Reminder Engine. The Reminder Engine detects a selection, by a first user account, of one or more reminder attributes for a message received in an online chat session. The Reminder Engine generates a reminder object for the message according to the one or more selected reminder attributes. The Reminder Engine receives a reminder notification based on expiration of a duration attribute associated with the reminder object.

19 Claims, 8 Drawing Sheets

REMINDER NOTIFICATIONS FOR MESSAGES

FIELD

Various embodiments relate generally to digital communication, and more particularly, to message reminders.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION OF THE DRAWINGS

Various embodiments of a Reminder Engine as described herein provide functionality for a user account(s) to set a reminder(s) for various messaged in various online chat sessions. The reminder acts as a visual cue within an online chat session (or reminder location) to remind the user account to draft and send a responsive message. The user account can set a reminder for any type of message in an online chat session (or online chat channel). A reminder can be set for a message received in the online chat session and for a message sent in the online chat session.

The user account selects a message for which a reminder will be generated. The user account selects a reminder attribute, such as a reminder duration. A reminder notification will be displayed to the user account upon expiration of the reminder duration. In some embodiments, the reminder notification may be displayed by the Reminder Engine within the online chat session in which the associated message was received.

The Reminder Engine generates a reminder object upon selection of the message by the user account. The Reminder Engine displays the reminder object at a reminder location, such as a self-conversation online chat session for the user account, or a location at which multiple different reminder objects are collected and displayed. The user account may access the reminder location. For each reminder object, the reminder location provides a display of each reminder object with a representation of the corresponding message and a reschedule functionality. In some embodiments, a reminder object can be rescheduled from the reminder location or from its corresponding message in the online chat session.

A reminder object is linked to the location of the corresponding message in the appropriate online chat session. As such, a reminder object displayed in the reminder location further acts as a selectable shortcut for accessing the corresponding message's location in the appropriate online chat session. The Reminder Engine detects the user account's selection of the displayed reminder object and initiates access of the appropriate online chat session by the user account.

In some embodiments, reminder objects may be stored in local memory of a computer device associated with the user account. For example, a portion of local cache memory may be dedicated for the storage and management of reminder objects for messages selected by the user account. The Reminder Engine updates the local cache memory with reminder objects for messages selected by the user account while the user account was active via a different computer device(s).

In some embodiments, one or more messages of an online chat session(s) may have a message retention period indicating an amount of time during which the message(s) are to be stored locally (or accessible by the user account). Upon expiration of the message retention period, the message(s) may be cleared, deleted and/or removed. For example, upon expiration of the message retention period, the user account may no longer be able to access the message(s) or the accessibility of the message(s) may be modified. In some embodiments, the Reminder Engine detects that a message with an associated reminder object will be removed due to an upcoming expiration of a message retention period. The reminder object for that message may have a reminder duration attribute that sets a range of time that will expire after expiration of the message retention period. That is, the message the user account wishes to be reminded to respond to will not be accessible to the user account before the reminder notification will be sent because the message retention period will expire prior to the reminder object's reminder duration attribute.

Upon detecting that the upcoming expiration of a message retention period will occur prior to the expiration of the reminder duration attribute, the Reminder Engine modifies the reminder duration attribute to have the expected expiration of the message retention period. In some embodiments, upon setting the reminder duration attribute to the message retention period, the Reminder Engine may display a notification to the user account describing the updated expected reminder expiration.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
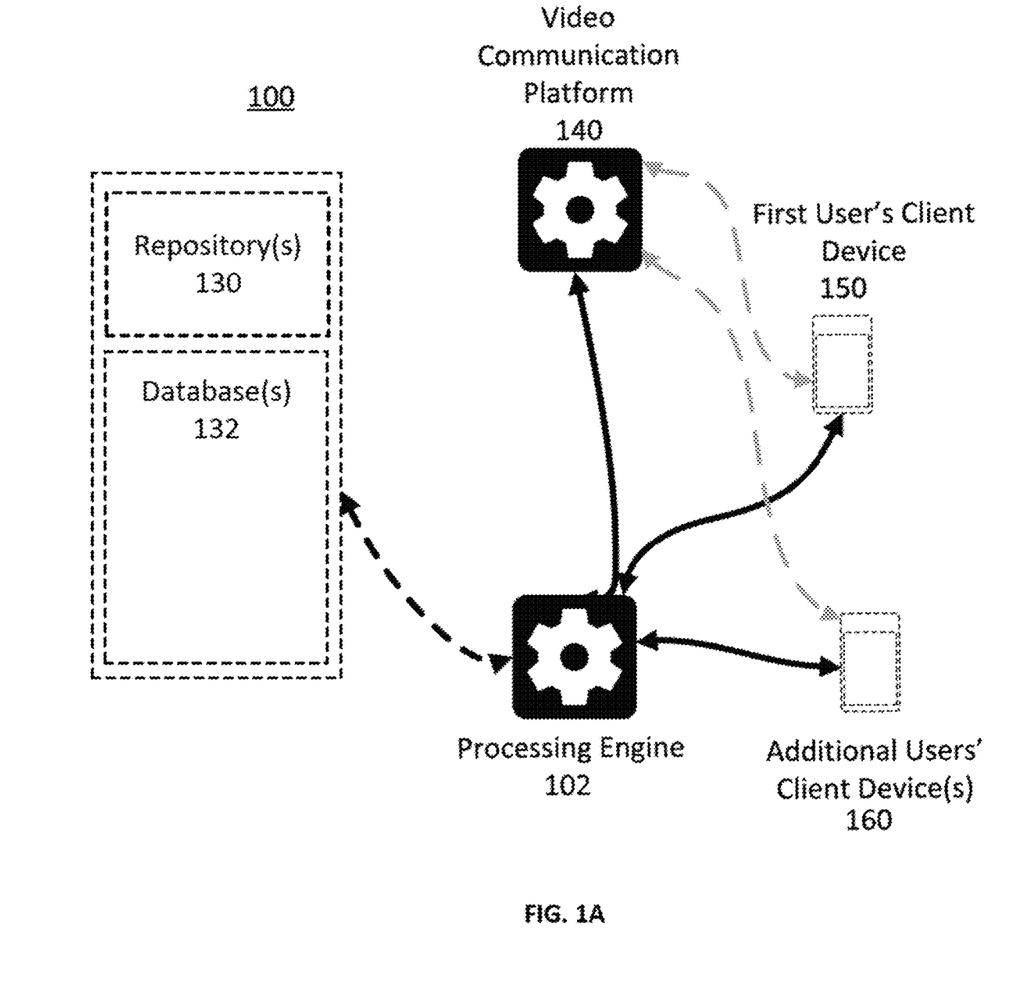
FIG. 1A is a diagram illustrating an exemplary environment in which some embodiments may operate.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform various methods described herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
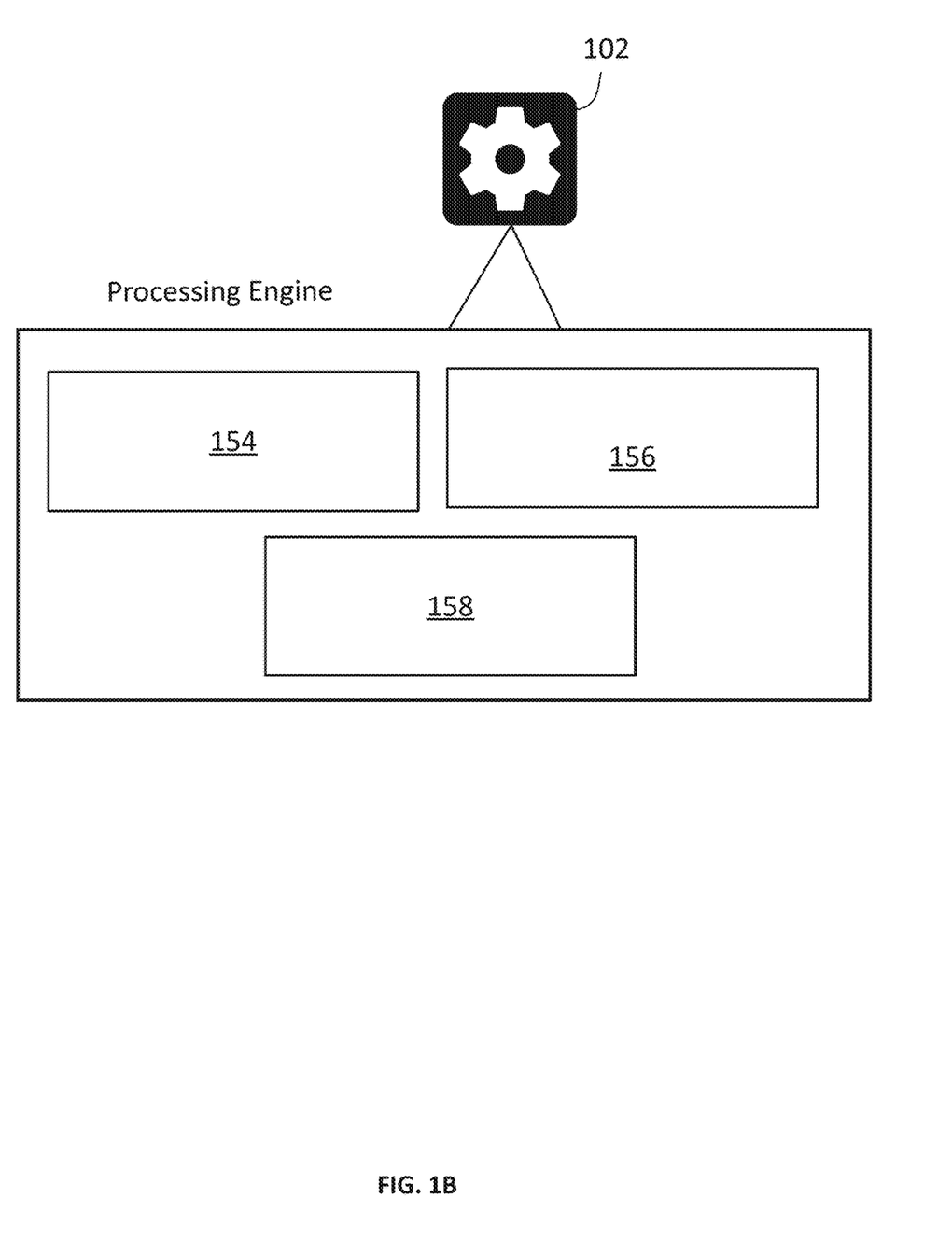
FIG. 1B is a diagram illustrating an exemplary environment in which some embodiments may operate.

FIG. 1B is a diagram illustrating exemplary software modules 154, 156, 158 of a Reminder Engine that may execute at least some of the steps, operations, actions, features and functionality described herein. According to some embodiments, one or more of exemplary software modules 154, 156, 158 may be part of the processing engine 102. In some embodiments, one or more of the exemplary software modules 154, 156, 158 may be distributed throughout the communication platform 140.

The module 154 functions to detect selection of reminder attributes for a message(s).

The module 156 functions to generate a reminder object for the message according to the one or more selected reminder attributes.

The module 158 functions to receive a reminder notification based on expiration of a duration attribute associated with the reminder object The above modules 154, 156, 158 and their functions will be described in further detail in relation to FIGS. 2, 3, 4, 5 and 6.

Figure 2:
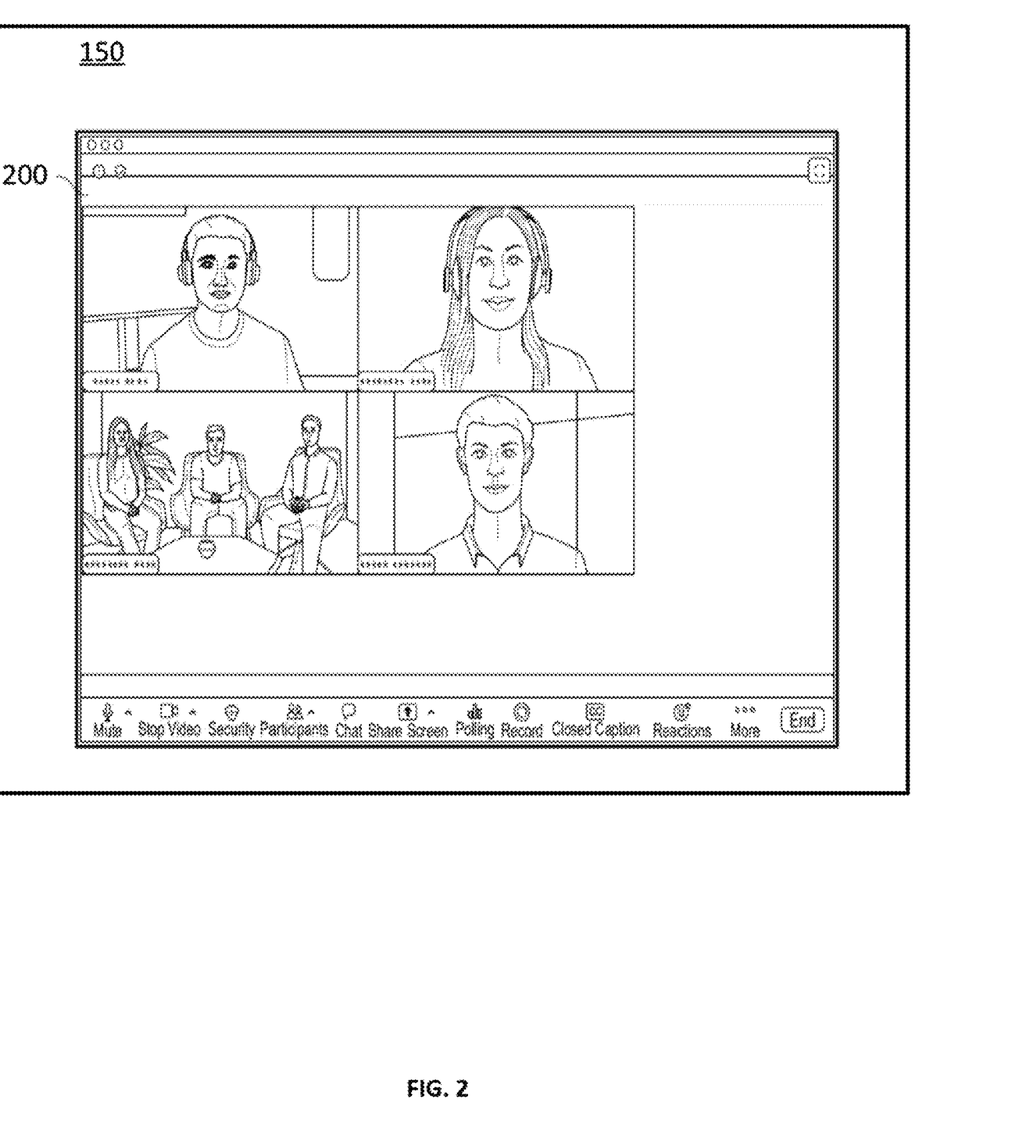
FIG. 2 is a diagram illustrating an exemplary environment in which some embodiments may operate.

As shown in the example of FIG. 2 a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
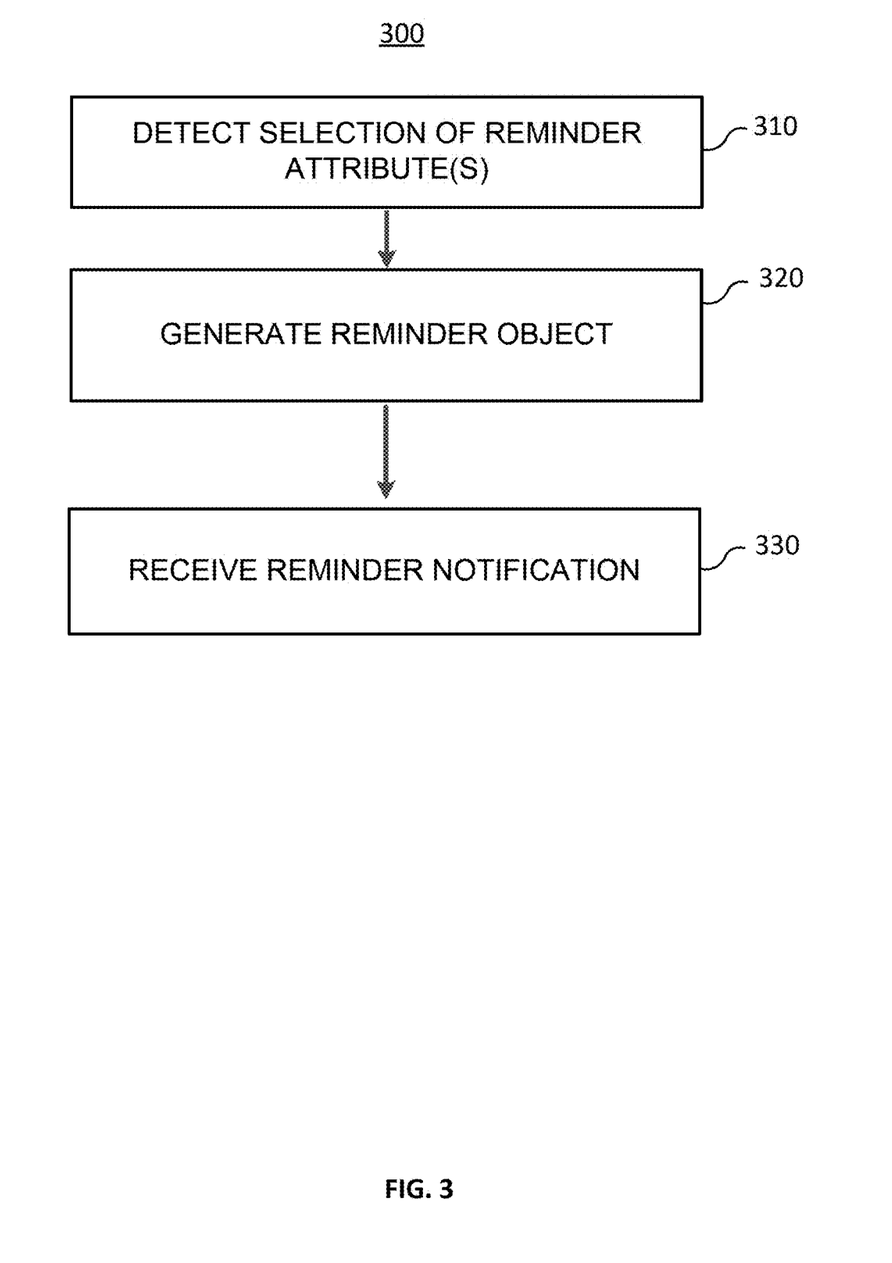
FIG. 3 is a diagram illustrating an exemplary flowchart according to some embodiments.

As shown in flowchart diagram 300 of the example of FIG. 3, the Reminder Engine detects a selection, by a first user account, of one or more reminder attributes for a message received in an online chat session. (Step 310) In some embodiments, the Reminder Engine detects a first message in a particular online chat session is selected by the first user account. The Reminder Engine further receives one or more reminder attributes selected by the user account.

The one or more reminder attributes indicate when a notification reminder should be presented to the first user account due to the presence of a condition. For example, the one or more reminder attributes may indicate that the first user account requests a reminder notification for the message be sent to the first user account in 30 minutes, 1 hour, 1 week, 2 weeks, 1 month, 6 months and/or 1 year. The reminder notification is intended to act as visual cue to remind the first user account to draft and send a responsive message for the message associated with the reminder object.

The Reminder Engine generates a reminder object for the message according to the one or more selected reminder attributes. (Step 320) According to some embodiments, the Reminder Engine places the reminder object in a reminder location. The reminder object may be linked to a location of the message in the online chat session. For example, the link may act as a shortcut from the reminder object to the location of the message in the online chat session.

In some embodiments, the reminder location may be a collection of a plurality of reminder objects generated for respective different messages. For example, the first user account may have selected various messages across different online chat session for which a separate reminder object is generated. The reminder location may be a location at which all reminder objects for different messages are collected and viewable.

In some embodiments, the reminder location may be a dedicated online chat session that includes only the first user account. For example, the dedicated online chat session may be an active self-conversation online chat for the first user account. In some embodiments, the reminder location may be a reminder aggregation location accessible by the first user account when the first user account is accessing any of the different online chat sessions. For example, the different online chat sessions may be accessible via a client application for a video communications environment.

The client application may include a user interface 200 and may provide the first user account with access to the multiple different online chat sessions and/or online chat channels. A selectable tab may be displayed in the user interface 200 for accessing the reminder aggregation location. Upon detection of selection of the tab by the first user account, the Reminder Engine may initiate access of the reminder aggregation location by the first user account. Access of the reminder aggregation location includes display of one or more reminder objects, associated with respective different message, that have yet to expire. Each respective reminder object displayed in the reminder location may include display of a representation of the message proximate to a reminder rescheduling functionality.

The Reminder Engine receives a reminder notification based on expiration of a duration attribute associated with the reminder object. (Step 330) In some embodiments, the Reminder Engine receives a push notification representing the reminder object due to the expiration of a reminder duration attribute. For example, the reminder object may have a reminder duration attribute of 24 hours as measured from when the Reminder Engine detected the first user account's selection of the reminder attributes for the message. That is, when the Reminder Engine received a request from the first user account for a reminder to be sent to the first user account after a certain amount of time has passed. Upon expiration of the duration of time defined by the reminder duration attribute, the Reminder Engine receives and displays a reminder expiration notification in the reminder location. In some embodiments, the reminder expiration notification may be displayed in any portion of a user interface that is currently being accessed by the first user account.

Figure 4:
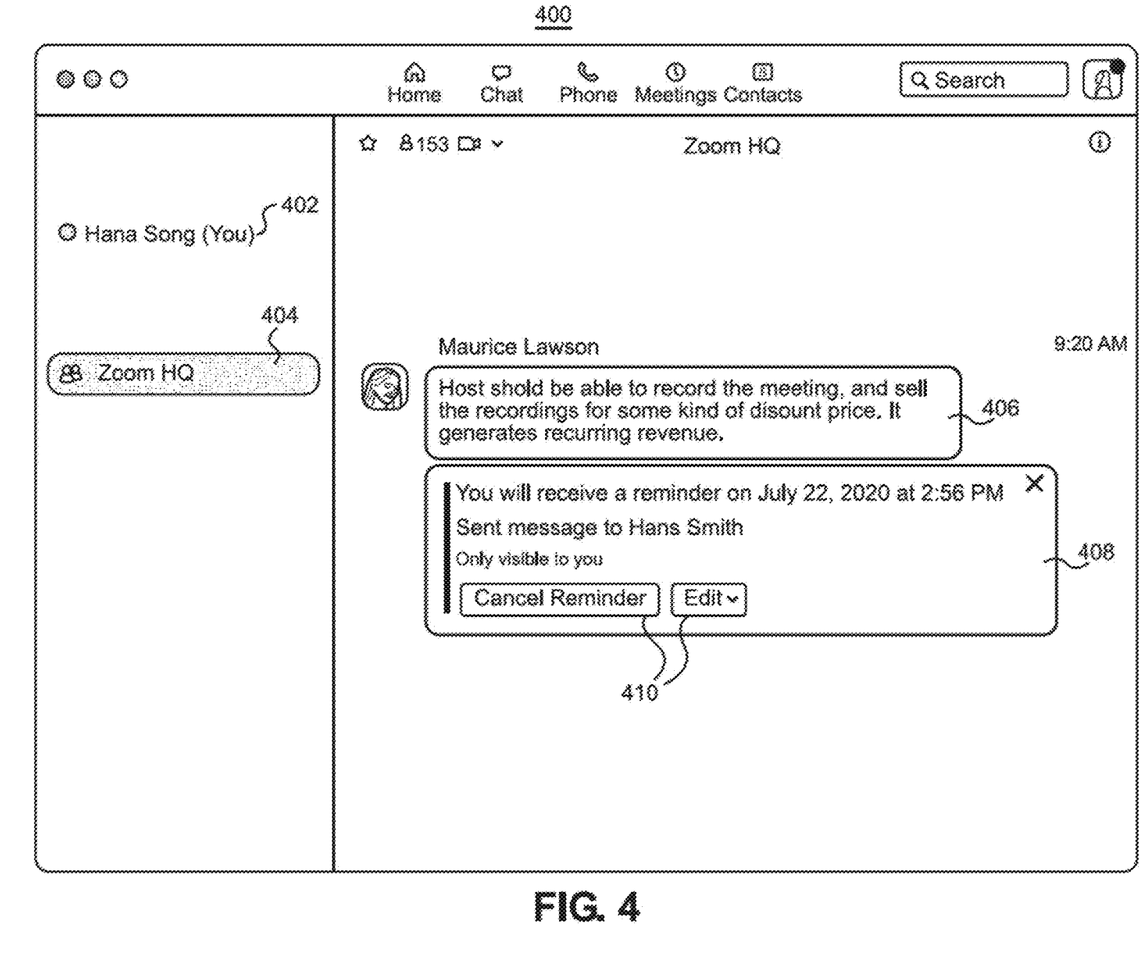
FIG. 4 is a diagram illustrating an exemplary environment in which some embodiments may operate.

As shown in diagram 400 of the example of FIG. 4, a user interface associated with a client application for a video communications environment may provide access to one or more online chat sessions 402, 404. Within a display of an online chat session 404, a displayed message 406 may have an associated reminder object. The Reminder Engine displays a reminder indicator 408 associated with the reminder object. The reminder indicator 408 is displayed proximate to a location of the message 406 within the online chat session. In some embodiments, the reminder indicator 408 presents an expected expiration time of the reminder object and provides access to one or more types of reminder object modification functionalities 410. The expected expiration time is when the reminder notification will be presented (and/or pushed) to the first user account. In some embodiments, the first user may select the reminder indicator 408 to be hidden from being displayed for a selected amount of time.

Figure 5:
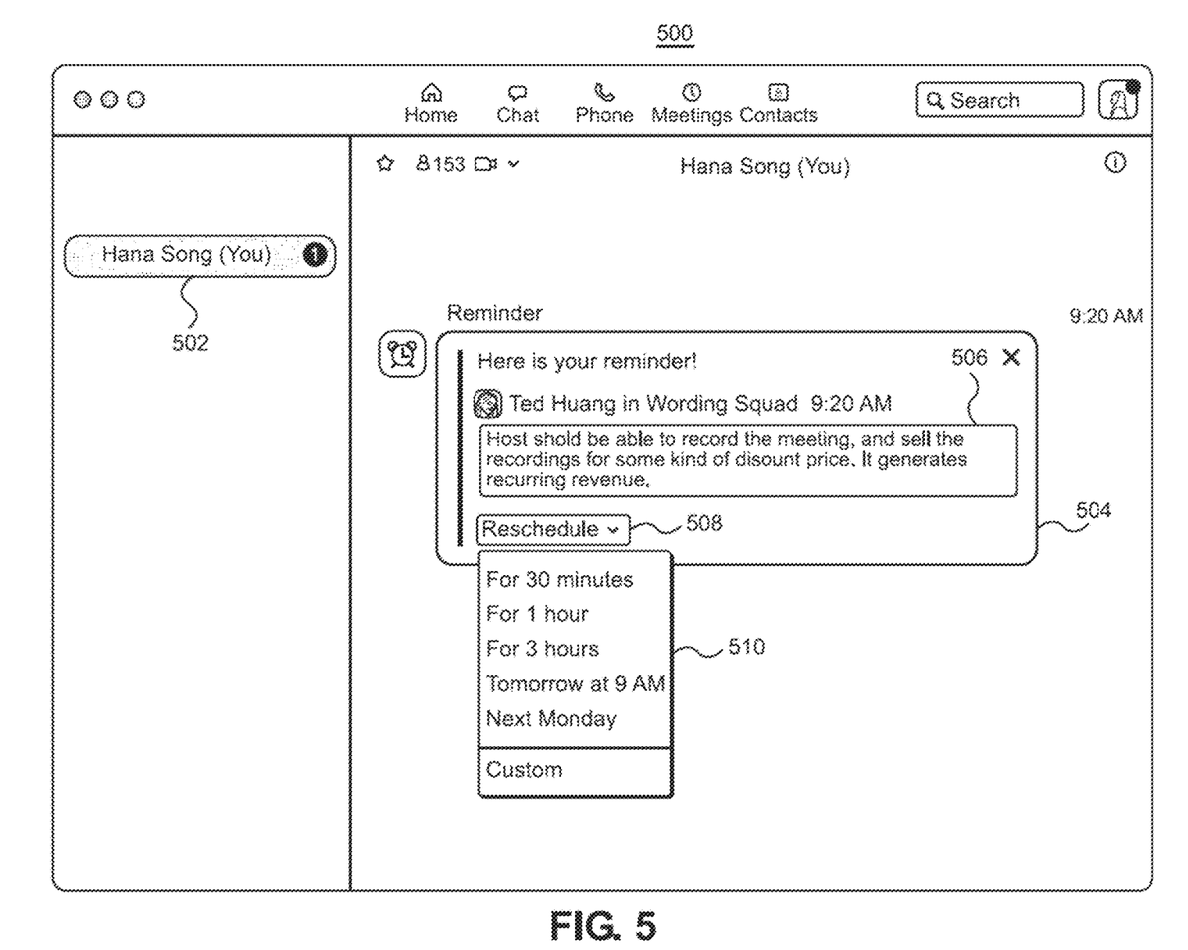
FIG. 5 is a diagram illustrating an exemplary environment in which some embodiments may operate.

As shown in diagram 350 of the example of FIG. 5, the Reminder Engine may display a selectable tab 502 for accessing a reminder location (such as a self-conversation online chat session or a reminder collection location). The reminder location displays a reminder object 504. The reminder object 504 includes a representation of the message 506 associated with the reminder object 504 and a reschedule functionality 508. The Reminder Engine receives selection of the rescheduling functionality 508 by the first user account.

Based on the selection of rescheduling functionality 508, the Reminder Engine displays a rescheduling menu 510 which provides one or more selectable reminder attributes. Each of the displayed selectable reminder attributes represent a duration of time. Upon expiration of the duration of time, a reminder notification will be displayed to the first user account.

The Reminder Engine receives a selection of a modification of one or more of the reminder attributes of the reminder object for the message via the rescheduling functionality. For example, the first user account may select the reminder expiration duration of time should be modified to 30 minutes. Based on the selection a reminder attribute from the rescheduling menu 510, the Reminder Engine updates the reminder objects current reminder attributes according to the selected modification (i.e. the 30 minutes).

In some embodiments, the Reminder Engine receives selection of the representation of the message 506 in the displayed reminder object 504. Based on the detected selection, the Reminder Engine initiates access, by the first user account, of the location of the message in the online chat session in which the message was received. For example, the Reminder Engine transitions from display of the reminder location to display of the online chat session in which the message was received. In some embodiments, upon displaying the online chat session, the Reminder Engine further displays the message location in the online chat session. For example, the message may have been received two days ago and the online chat session may have since received multiple subsequent messages. When the Reminder Engine displays the online chat session due to selection of the representation of the message 506, the Reminder Engine displays the location in the online chat session at which the message appears—as opposed to a most recent message received in the online chat session.

Figure 6:
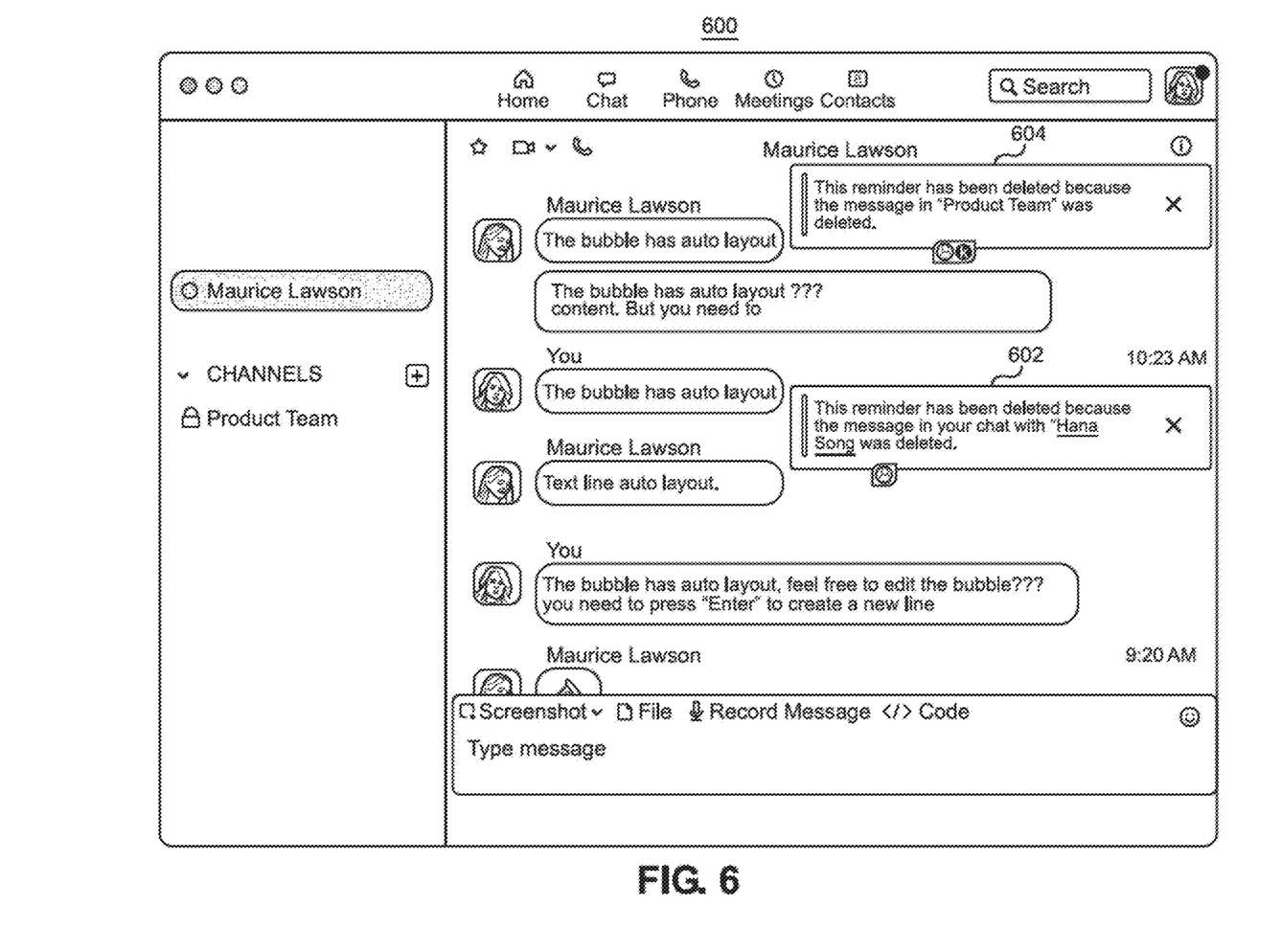
FIG. 6 is a diagram illustrating an exemplary environment in which some embodiments may operate.

As shown in diagram 600 of the example of FIG. 6, the Reminder Engine receives a deletion indication. For example, a deletion indication may indicate the message in the online chat session has been deleted by a sender user account that sent the message. In some embodiments, the deletion indication may indicate that an the online chat session (or online chat channel) in which the message was received has been deleted by a different user account. In response to the deletion indication, the Reminder Engine deletes the reminder object associated with the deleted message or the reminder object that corresponds with a message in the deleted online chat session (or online chat channel). The Reminder Engine further displays an overlay message 602, 604 at a display location included within a respective online chat session the first user account is currently accessing. For example, the first user account may be accessing a different online chat session and the Reminder Engine may display the overlay message 602, 604 at a display location within that different online chat session. The overlay message 602, 604 is based on the deletion indication. For example, the overlay message 602, 604 may include content communicating that the message has been deleted or content communicating that the online chat session (or online chat channel) has been deleted.

Figure 7:
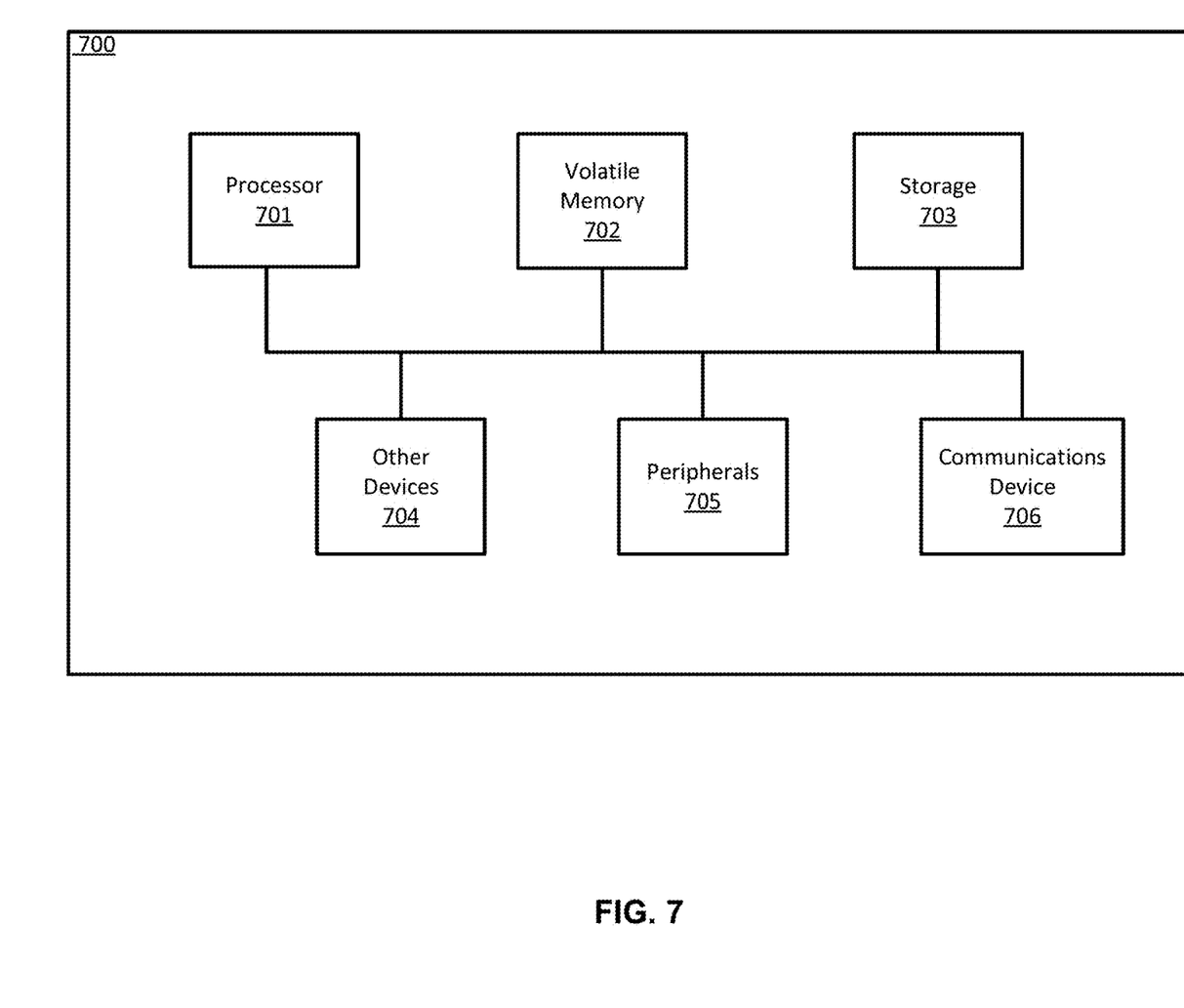
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: detecting a selection, by a first user account, of one or more reminder attributes for a message received in an online chat session; generating a reminder object for the message according to the one or more selected reminder attributes;

and receiving a reminder notification based on expiration of a duration attribute associated with the reminder object.

Example 2: The method of Example 1, wherein generating a reminder object comprises: placing the reminder object in a reminder location, the reminder object linked to a location of the message in the online chat session.

Example 3: The method of any Examples 1-2, further comprising: receiving selection of a display of the reminder object in the reminder location; and initiating access of the location of the message in the online chat session, by the first user account, in which the message was received.

Example 4: The method of any Examples 1-3, further comprising: wherein receiving a reminder notification based on expiration of a duration attribute associated with the reminder object comprises: receiving a push notification representing the reminder object due to the expiration of the duration attribute.

Example 5: The method of any Examples 1-4, further comprising: displaying a reminder indicator associated with the reminder object proximate to a location of the message received in the online chat session.

Example 6: The method of any Examples 1-5, further comprising: receiving an indication that the message in the online chat session has been deleted by a sender user account that sent the message; and deleting the reminder object based on the deletion by the sender user account.

Example 7: The method of any Examples 1-6, further comprising: receiving an indication that the online chat session in which the message was received has been deleted by a different user account; and deleting the reminder object based on the deletion by the different user account.

Example 8: A non-transitory computer-readable medium having a computer-readable program code embodied therein to be executed by one or more processors, the program code including instructions for: detecting a selection, by a first user account, of one or more reminder attributes for a message received in an online chat session; generating a reminder object for the message according to the one or more selected reminder attributes; and receiving a reminder notification based on expiration of a duration attribute associated with the reminder object.

Example 9: The non-transitory computer-readable medium of Example 8, further comprising: wherein generating a reminder object comprises: placing the reminder object in a reminder location, the reminder object linked to a location of the message in the online chat session; and further comprising: receiving selection of the reminder location; and displaying, in the reminder location, a representation of the message proximate to a reminder rescheduling functionality.

Example 10: The non-transitory computer-readable medium of any Examples 8-9, further comprising: wherein the reminder location comprises a collection of a plurality of reminder objects generated for respective different messages, selected by the first user account, located in different online chat sessions; wherein the reminder location further comprises one of: (i) a dedicated online chat session that includes only the first user account; and (ii) a reminder aggregation location accessible by the first user account when the first user account is accessing any of the different online chat sessions.

Example 11: The non-transitory computer-readable medium of any Examples 8-10, further comprising: receiving selection of the rescheduling functionality; receiving a selection of a modification of one or more of the reminder attributes of the reminder object for the message via the rescheduling functionality; updating one or more of the reminder attributes according to the selected modification; receiving selection of the representation of the message; and initiating access, by the first user account, of the location of the message in the online chat session in which the message was received.

Example 12: The non-transitory computer-readable medium of any Examples 8-11, further comprising: wherein receiving a reminder notification based on expiration of a duration attribute associated with the reminder object comprises: receiving a push notification representing the reminder object due to the expiration of the duration attribute; and displaying a reminder expiration notification in the reminder location, the reminder expiration notification indicating expiration of the reminder object.

Example 13: The non-transitory computer-readable medium of any Examples 8-12, further comprising: displaying a reminder indicator associated with the reminder object proximate to a location of the message received in the online chat session; wherein the reminder indicator presents an expected expiration time of the reminder object and provides access to a reminder object modification functionality.

Example 14: The non-transitory computer-readable medium of any Examples 8-13, further comprising: receiving an indication that the message in the online chat session has been deleted by a sender user account that sent the message; deleting the reminder object based on the deletion by the sender user account; and displaying an overlay message at a display location included within a respective online chat session the first user account is currently accessing, the overlay message indicating deletion of the message.

Example 15: The non-transitory computer-readable medium of any Examples 8-14, further comprising: receiving an indication that the online chat session in which the message was received has been deleted by a different user account; deleting the reminder object based on the deletion by the different user account; and displaying an overlay message at a display location included within a respective online chat session the first user account is currently accessing, the overlay message indicating deletion of the online chat session.

Example 16: A communication system comprising one or more processors configured to perform the operations of: detecting a selection, by a first user account, of one or more reminder attributes for a message received in an online chat session; generating a reminder object for the message according to the one or more selected reminder attributes; and receiving a reminder notification based on expiration of a duration attribute associated with the reminder object.

Example 17: The communication system of Example 16, further comprising: wherein generating a reminder object comprises: placing the reminder object in a reminder location, the reminder object linked to a location of the message in the online chat session; and further comprising: receiving selection of the reminder location; and displaying, in the reminder location, a representation of the message proximate to a reminder rescheduling functionality; receiving selection of the rescheduling functionality; receiving a selection of a modification of one or more of the reminder attributes of the reminder object for the message via the rescheduling functionality; updating one or more of the reminder attributes according to the selected modification; receiving selection of the representation of the message; and initiating access, by the first user account, of the location of the message in the online chat session in which the message was received.

Example 18: The communication system of any Examples 16-17, further comprising: wherein the reminder location comprises a collection of a plurality of reminder objects generated for respective different messages, selected by the first user account, located in different online chat sessions; wherein the reminder location further comprises one of: (i) a dedicated online chat session that includes only the first user account; and (ii) a reminder aggregation location accessible by the first user account when the first user account is accessing any of the different online chat sessions.

Example 19: The communication system of any Examples 16-18, further comprising: displaying a reminder indicator associated with the reminder object proximate to a location of the message received in the online chat session; wherein the reminder indicator presents an expected expiration time of the reminder object and provides access to a reminder object modification functionality; wherein receiving a reminder notification based on expiration of a duration attribute associated with the reminder object comprises: receiving a push notification representing the reminder object due to the expiration of the duration attribute; and displaying a reminder expiration notification in the reminder location, the reminder expiration notification indicating expiration of the reminder object.

Example 20: The communication system of any Examples 16-19, further comprising: receiving a deletion indication of one of: (i) the message in the online chat session has been deleted by a sender user account that sent the message or (ii) the online chat session in which the message was received has been deleted by a different user account; deleting the reminder object; and displaying an overlay message at a display location included within a respective online chat session the first user account is currently accessing, the overlay message based on the deletion indication.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   detecting a selection, by a first user account, of one or more reminder attributes for a message received in a first online chat session from a sender user account;
   generating a reminder object for the message according to the one or more selected reminder attributes;
   detecting whether the message has been deleted from the first online chat session;
   due to detecting the message has been deleted, initiating display of an overlay message at a display location, currently viewed by the first user account, in a second online chat session, the overlay message indicating deletion of the message, wherein respective messages in the second online chat session are different than respective messages in the first online chat session; and
   due to detecting the reminder message has not been deleted, receiving a reminder notification based on expiration of a duration attribute associated with the reminder object.

2. The computer-implemented method of claim 1, wherein generating a reminder object comprises:
   placing the reminder object in a reminder location, the reminder object linked to a location of the message in the first online chat session.

3. The computer-implemented method of claim 2, further comprising:
   receiving selection of a display of the reminder object in the reminder location; and
   initiating access of the location of the message in the first online chat session, by the first user account, in which the message was received.

4. The computer-implemented method of claim 1, wherein receiving a reminder notification based on expiration of a duration attribute associated with the reminder object comprises:
   receiving a push notification representing the reminder object due to the expiration of the duration attribute.

5. The computer-implemented method of claim 1, further comprising:
   displaying a reminder indicator associated with the reminder object proximate to a location of the message received in the first online chat session.

6. The computer-implemented method of claim 1, further comprising:
   receiving an indication that the first online chat session in which the message was received has been deleted by a different user account; and
   deleting the reminder object based on the deletion by the different user account.

7. The computer-implemented method of claim 1, wherein detecting the message has been deleted comprises:
   detecting the message has been deleted due to deletion of the first online chat session.

8. The computer-implemented method of claim 1, wherein detecting whether the message has been deleted comprises:
   receiving an indication the message has been deleted from the first online chat session by a second user account having access to the message and the first online chat session, the second user account different than the sender user account.

9. The computer-implemented method of claim 1, wherein initiating display of an overlay message at a display location comprises:
   initiating display of the overlay message at a display location, currently viewed by the first user account, of a previous message received in a second online chat session.

10. A non-transitory computer-readable medium having a computer-readable program code embodied therein to be executed by one or more processors, the program code including instructions for:
    detecting a selection, by a first user account, of one or more reminder attributes for a message received in a first online chat session from a sender user account;
    generating a reminder object for the message according to the one or more selected reminder attributes;
    detecting whether the message has been deleted from the first online chat session;
    due to detecting the message has been deleted, initiating display of an overlay message at a display location, currently viewed by the first user account, in a second online chat session, the overlay message indicating deletion of the message, wherein respective messages in the second online chat session are different than respective messages in the first online chat session; and due to detecting the message has not been deleted, receiving a reminder notification based on expiration of a duration attribute associated with the reminder object.

11. The non-transitory computer-readable medium of claim 10, wherein generating a reminder object comprises:
placing the reminder object in a reminder location, the reminder object linked to a location of the message in the first online chat session; and further comprising:
receiving selection of the reminder location; and
displaying, in the reminder location, a representation of the message proximate to a reminder rescheduling functionality.

12. The non-transitory computer-readable medium of claim 11, wherein the reminder location comprises a collection of a plurality of reminder objects generated for respective different messages, selected by the first user account, located in different online chat sessions;

wherein the reminder location further comprises one of:
(i) a dedicated online chat session that includes only the first user account; and
(ii) a reminder aggregation location accessible by the first user account when the first user account is accessing any of the different online chat sessions.

13. The non-transitory computer-readable medium of claim 11, further comprising:

receiving selection of the rescheduling functionality;
receiving a selection of a modification of one or more of the reminder attributes of the reminder object for the message via the rescheduling functionality;
updating one or more of the reminder attributes according to the selected modification;
receiving selection of the representation of the message; and
initiating access, by the first user account, of the location of the message in the first online chat session in which the message was received.

14. The non-transitory computer-readable medium of claim 11, wherein receiving a reminder notification based on expiration of a duration attribute associated with the reminder object comprises:

receiving a push notification representing the reminder object due to the expiration of the duration attribute; and
displaying a reminder expiration notification in the reminder location, the reminder expiration notification indicating expiration of the reminder object.

15. The non-transitory computer-readable medium of claim 10, further comprising:

displaying a reminder indicator associated with the reminder object proximate to a location of the message received in the first online chat session;
wherein the reminder indicator presents an expected expiration time of the reminder object and provides access to a reminder object modification functionality.

16. A communication system comprising one or more processors configured to perform the operations of:

detecting a selection, by a first user account, of one or more reminder attributes for a message received in a first online chat session from a sender user account;

generating a reminder object for the message according to the one or more selected reminder attributes;

detecting whether the message has been deleted from the first online chat session;

due to detecting the message has been deleted, initiating display of an overlay message at a display location, currently viewed by the first user account, in a second online chat session, the overlay message indicating deletion of the message, wherein respective messages in the second online chat session are different than respective messages in the first online chat session; and due to detecting the message has not been deleted, receiving a reminder notification based on expiration of a duration attribute associated with the reminder object.

17. The communication system of claim 16, wherein generating a reminder object comprises:

placing the reminder object in a reminder location, the reminder object linked to a location of the message in the first online chat session; and further comprising:
receiving selection of the reminder location; and
displaying, in the reminder location, a representation of the message proximate to a reminder rescheduling functionality;
receiving selection of the rescheduling functionality;
receiving a selection of a modification of one or more of the reminder attributes of the reminder object for the message via the rescheduling functionality;
updating one or more of the reminder attributes according to the selected modification;
receiving selection of the representation of the message;
initiating access, by the first user account, of the location of the message in the first online chat session in which the message was received.

18. The communication system of claim 17, wherein the reminder location comprises a collection of a plurality of reminder objects generated for respective different messages, selected by the first user account, located in different online chat sessions;

wherein the reminder location further comprises one of:
(i) a dedicated online chat session that includes only the first user account; and
(ii) a reminder aggregation location accessible by the first user account when the first user account is accessing any of the different online chat sessions.

19. The non-transitory computer-readable medium of claim 17, further comprising:

displaying a reminder indicator associated with the reminder object proximate to a location of the message received in the first online chat session;
wherein the reminder indicator presents an expected expiration time of the reminder object and provides access to a reminder object modification functionality;
wherein receiving a reminder notification based on expiration of a duration attribute associated with the reminder object comprises:
receiving a push notification representing the reminder object due to the expiration of the duration attribute; and
displaying a reminder expiration notification in the reminder location, the reminder expiration notification indicating expiration of the reminder object.

* * * * *